United States Patent [19]

Etzbach et al.

[11] Patent Number: 5,162,545
[45] Date of Patent: Nov. 10, 1992

[54] MALONIC ACID DYES AND POLYCONDENSATION PRODUCTS THEREOF

[75] Inventors: Karl-Heinz Etzbach, Frankenthal; Karin H. Beck, Ludwigshafen; Gerhard Wagenblast, Weisenheim am Berg, all of Fed. Rep. of Germany

[73] Assignee: BASF Aktiengesellschaft, Ludwigshafen, Fed. Rep. of Germany

[21] Appl. No.: 596,385

[22] Filed: Oct. 12, 1990

[30] Foreign Application Priority Data

Oct. 13, 1989 [DE] Fed. Rep. of Germany ....... 3934190

[51] Int. Cl.$^5$ .................. C07D 209/56; C09B 56/12; C07B 29/00
[52] U.S. Cl. .................. 548/426; 552/208; 552/220; 552/266; 534/654; 534/655; 534/658; 534/659; 534/666; 534/670; 534/688; 252/299.1
[58] Field of Search .................. 252/299.01; 560/129; 552/208, 220, 266; 534/654, 655, 658, 659, 666, 670, 688; 548/426

[56] References Cited

U.S. PATENT DOCUMENTS

| | | | |
|---|---|---|---|
| 4,379,934 | 4/1983 | Graser et al. | 546/37 |
| 4,446,324 | 5/1984 | Graser | 546/37 |
| 4,631,328 | 12/1986 | Ringsdorf et al. | 526/259 |
| 4,681,699 | 7/1987 | Etzbach | 252/299.1 |
| 4,702,945 | 10/1987 | Etzbach et al. | 428/1 |
| 4,721,779 | 1/1988 | Etzbach | 534/577 |
| 4,724,259 | 2/1988 | Etzbach et al. | 534/577 |
| 4,943,617 | 7/1990 | Etzbach et al. | 525/329.9 |

FOREIGN PATENT DOCUMENTS

| | | |
|---|---|---|
| 0090282 | 10/1983 | European Pat. Off. |
| 0112798 | 7/1984 | European Pat. Off. |
| 0172517 | 2/1986 | European Pat. Off. |
| 0260687 | 3/1988 | European Pat. Off. |
| 0268154 | 5/1988 | European Pat. Off. |
| 0278446 | 8/1988 | European Pat. Off. |
| 2451782 | 5/1976 | Fed. Rep. of Germany |
| 2240048 | 9/1990 | Japan |

OTHER PUBLICATIONS

"Photochromic Lc polymers main chain and side chain polymers containing azobenzene mesogens" Liq. Crystal vol. 4, No. 5 pp. 513–527 (1989).

Makromol. Chem., Rapid Commun., Band 6, Nr. 4 1985, Seiten 291–299 Basel, CH; B. Reck et al;: "Combined liquid crystalline polymers: Mesogens in the main chain and as side groups".

Primary Examiner—Robert L. Stoll
Assistant Examiner—Shean C. Wu
Attorney, Agent, or Firm—Oblon, Spivak, McClelland, Maier & Neustadt

[57] ABSTRACT

Malonic acid dyes capable of forming polycondensation products have the formula

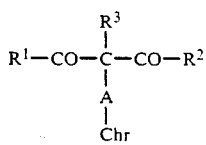

where
$R^1$ and $R^2$ are each independently of the other hydroxyl, $C_1$–$C_6$-alkoxy, chlorine or bromine,
$R^3$ is hydrogen or $C_1$–$C_6$-alkyl,
A is $C_1$–$C_{20}$-alkylene which may be interrupted by oxygen atoms or by imino or $C_1$–$C_4$-alkylimino groups, and
Chr is the radical of a chromophore derived from an anthraquinone, perylene, disazo or trisazo dye or else, when $R^3$ is $C_1$–$C_6$-alkyl, from a monoazo dye.

3 Claims, No Drawings

MALONIC ACID DYES AND POLYCONDENSATION PRODUCTS THEREOF

The present invention relates to novel malonic acid dyes of the formula I

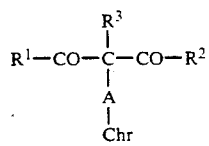

where
$R^1$ and $R^2$ are identical or different and each is independently of the other hydroxyl, $C_1$–$C_6$-alkoxy, chlorine or bromine,
$R^3$ is hydrogen or $C_1$–$C_6$-alkyl,
A is $C_1$–$C_{20}$-alkylene which may be interrupted by one or more oxygen atoms or by one or more imino or $C_1$–$C_4$-alkylimino groups, and
Chr is the radical of a chromophore derived from an anthraquinone, perylene, disazo or trisazo dye or else, when $R^3$ is $C_1$–$C_6$-alkyl, from a monoazo dye,
and to the polycondensation products thereof.

EP-A172,517 discloses azo dyes in which a 6-(4-cyanophenylazophen-4-oxy)hexyl radical or a 10-(4-methoxyphenylazophen-4-oxy)decyl radical is attached to diethyl malonate. Said reference also describes the polycondensation product of the cyano compound with 4,4'-bis(6-hydroxyhexyloxy)biphenyl and of the methoxy compound with 4,4'-bis(2-hydroxyethoxy)biphenyl.

EP-A-90,282 concerns polymers and copolymers derived from acrylic acid which possess a chromophore of the azo or anthraquinone dye series which in each case is bonded via a spacer to the carboxyl group of the acrylic acid moiety.

Similar acrylic acid polymers based on 1,5-diamino-4,8-dihydroxyanthraquinone are described in EP-A-260,687.

It is an object of the present invention to provide new dye monomers which readily undergo polycondensation. Also, the new dyes based on malonic acid should have advantageous application properties, in particular good compatibility with a polymer matrix. In addition, the polycondensed dyes should be very temperature and light resistant and highly dichroic and, if used as building blocks of liquid crystalline polymers, should ideally not affect the properties of the liquid crystalline matrix, i.e. the clear point, the phase characteristics, the viscosity or the formation of homogeneously planar or homeotropic textures.

We have found that this object is achieved by the malonic acid dyes of the formula I defined at the beginning.

Any alkyl and alkylene appearing in the above-mentioned formula may be either straight-chain or branched.

If A is interrupted by one or more oxygen atoms or by one or more alkylimino groups, preference is given to those radicals which are interrupted by 1 or 2 oxygen atoms or imino or alkylimino groups.

$R^1$ and $R^2$ are each for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$R^3$ is for example methyl, ethyl, propyl, isopropyl, butyl, isobutyl, sec-butyl, pentyl, isopentyl, neopentyl, tert-pentyl, hexyl or 2-methylhexyl.

A is for example

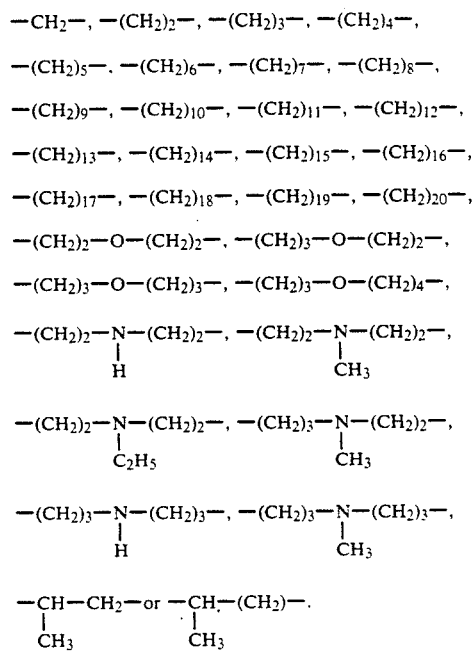

The chromophore radical Chr according to the present invention is derived from an anthraquinone, perylene, disazo or trisazo dye or else, when $R^3$ is $C_1$–$C_6$-alkyl, from a monoazo dye.

Suitable anthraquinone dye radicals are for example those of the formula II

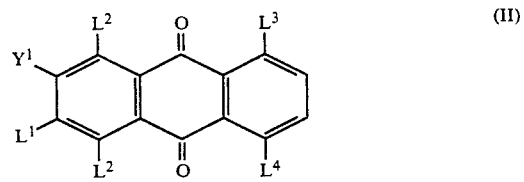

where
$Y^1$ is a chemical bond, oxygen, sulfur, imino, $C_1$–$C_4$-alkylimino, phenylene, phenyleneoxy, phenylenethio or a radical of the formula —CO—, —CO—O—, —O—CO—, —CO—S—, —S—CO—, —CO—NH—, —NH—CO—, —CO—M— or —M—CO—, where M is in both cases $C_1$–$C_4$-alkylimino,
$L^1$ is hydrogen or cyano or $L^1$ and $Y^1$ together are the radical of the formula

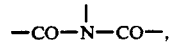

which is attached to the benzo ring via the carbonyl groups,
$L^2$ is in both representations (which may be identical or different) amino or hydroxyl,
$L^3$ is hydrogen, amino or hydroxyl, and
$L^4$ is hydrogen or amino.

The anthraquinone dyes from which these radicals are derived are dyes known per se. They are described for example in EP-A-90,282, EP-A-260,687 and Mol. Cryst. Liq. Cryst. 150a (1987), 1-168.

Suitable radicals of perylene dyes are for example those of the formula III

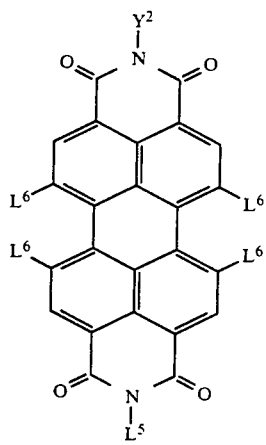
(III)

where $Y^2$ is a chemical bond, oxygen, phenylene or phenyleneoxy, $L^5$ is $C_1-C_{20}$-alkyl, which may be interrupted by an oxygen atom, or phenyl which is monosubstituted or polysubstituted by $C_1-C_{13}$-alkyl or $C_1-C_{13}$-alkoxy, and $L^6$ is hydrogen, chlorine, phenoxy pr halogen-, $C_1-C_4$-alkyl- or $C_1-C_4$-alkoxy-substituted phenoxy.

The perylene dyes from which these radicals are derived are dyes known per se. They are described for example in DE-A-2,451,782, U.S. Pat. No. 4,379,934 and U.S. Pat. No. 4,446.324.

Suitable radicals of disazo dyes are for example those of the formula IV

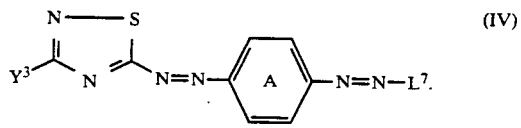
(IV)

where $Y^3$ is a chemical bond, oxygen, sulfur, imino, $C_1-C_4$-alkylimino, phenylene, phenyleneoxy, SO or $SO_2$ and $L^7$ is a radical of the formula

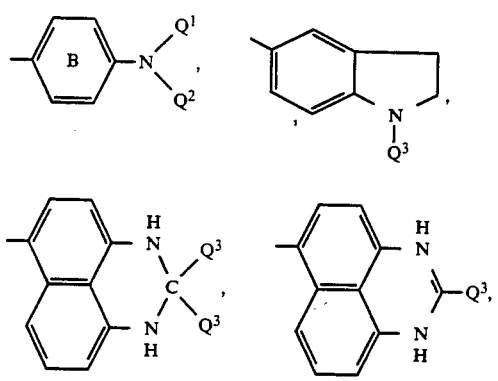

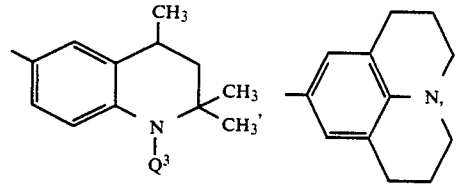

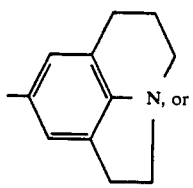

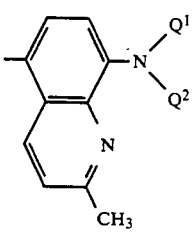

where the rings A and/or B may be monosubstituted or polysubstituted by $C_1-C_4$-alkyl, $C_1-C_4$-alkoxy or halogen and be benzofused, and $Q^1$ and $Q^2$ are identical or different and each is independently of the other hydrogen, $C_1-C_{12}$-alkyl, which may be phenyl-, ($C_1-C_7$-alkylcyclohexyl)phenyl-, cyano-, hydroxy- or $C_1-C_4$-alkanoyl-substituted, or $C_5-C_7$-cycloalkyl, or $Q^1$ and $Q^2$ together with the nitrogen atom joining them together are pyrrolidono, piperidino, morpholino, piperazino or N-($C_1-C_4$-alkyl)-piperazino, and $Q^3$ is hydrogen, $C_1-C_4$-alkyl or $C_5-C_7$-cycloalkyl.

The disazo dyes from which these radicals are derived are dyes known per se. They are described for example in U.S. Pat. No. 4,681,699.

Suitable radicals of trisazo dyes are for example those of the formula V

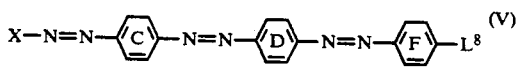
(V)

where

X is a radical of the formula

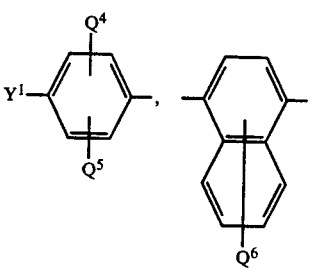

or

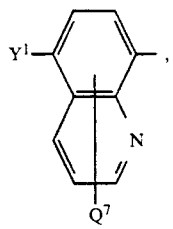

where
$Y^1$ is in each case as defined above,
$Q^4$ and $Q^5$ are identical or different and each is independently of the other hydrogen, halogen, $C_1$–$C_4$-alkyl or $C_1$–$C_4$-alkoxy,
$Q^6$ is hydrogen, methyl, hydroxyl or $C_1$–$C_4$-alkoxy and
$Q^7$ is methyl and the quinoline radical is bonded to the radical A via the bond adjacent to the ring nitrogen, and
$L^8$ is $C_1$–$C_{24}$-alkoxy, benzyloxy, phenylethoxy, $C_1$–$C_{24}$-monoalkylamino, $C_1$–$C_{24}$-dialkylamino, benzylamino, phenylethylamino, anilino, N-($C_1$–$C_{12}$-alkyl)-N-benzylamino, N-($C_1$–$C_{12}$-alkyl)-N-phenylethylamino or N-($C_1$–$C_{12}$-alkyl)anilino, in each of which the phenyl groups may be substituted by $C_1$–$C_{12}$-alkyl, cyclohexyl, 4-($C_1$–$C_{12}$-alkyl)cyclohexyl, $C_1$–$C_{24}$-alkoxy, phenoxy or $C_1$–$C_{24}$-alkanoyloxy, and the rings C, D and F may each be monosubstituted or polysubstituted by methyl, ethyl, methoxy or chlorine and benzofused.

The trisazo dyes from which these radicals are derived are dyes known per se. They are described for example in U.S. Pat. No. 4,724,259, U.S. Pat. No. 4,721,779 and EP-A-268,154.

Suitable radicals of monoazo dyes are for example those of the formula VI

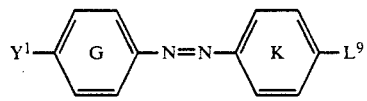

where $Y^1$ is as defined above, $L^9$ is cyano or $C_1$–$C_4$-alkoxy, and the rings G and K may each be additionally substituted by halogen or $C_1$–$C_4$-alkyl.

The monoazo dyes from which these radicals are derived are likewise known.

Preference is given to malonic acid dyes of the formula I where Chr is the radical of a chromophore which is derived from an anthraquinone, perylene, disazo or trisazo dye, notably a radical derived from an anthraquinone, perylene or trisazo dye.

Particular preference is given to malonic acid dyes of the formula I in which Chr is the radical of a chromophore which is derived from an anthraquinone dye and has the formula IIa or IIb

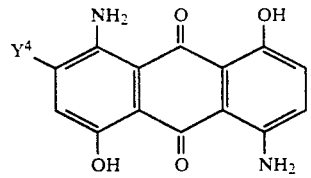

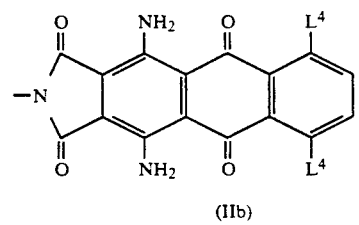

where $Y^4$ is phenylene or phenyleneoxy which is bonded to the radical A via the oxygen atom and each $L^4$ is as defined above.

Particular preference is further given to malonic acid dyes of the formula I in which Chr is the radical of a chromophore which is derived from a perylene dye and has the formula IIIa

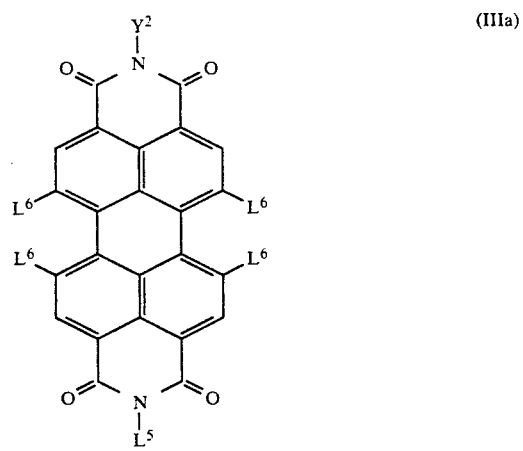

where
$Y^2$ is a chemical bond,
$L^5$ is $C_1$–$C_{12}$-alkyl and
$L^6$ is hydrogen or chlorine.

Particular preference is further given to malonic acid dyes of the formula I in which Chr is the radical of a chromophore which is derived from a disazo dye and has the formula IVa

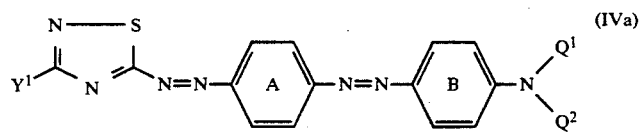

where
$Y^1$ is a defined above and
$Q^1$ and $Q^2$ are each independently of the other hydrogen or $C_1$–$C_8$-alkyl, and the rings A and B may be monosubstituted or disubstituted by methyl or methoxy and benzofused.

Particular preference is further given to malonic acid dyes of the formula I in which Chr is the radical of a chromophore which is derived from a trisazo dye and has the formula Va

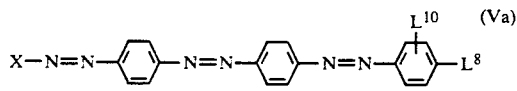 (Va)

where
X is a radical of the formula

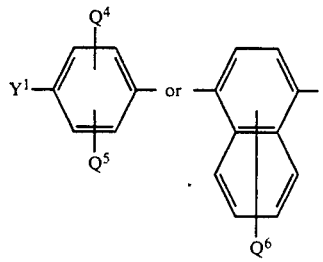

where
Y¹ is as defined above,
$Q^4$ is hydrogen,
$Q^5$ is hydrogen, methyl or ethyl and
$Q^6$ is hydrogen,
$L^8$ is $C_1$-$C_{10}$-alkoxy or benzyloxy, and
$L^{10}$ is hydrogen, methyl, ethyl, methoxy or chlorine.

Very particular emphasis must be given to malonic acid dyes of the formula I in which Chr is the radical of a chromophore derived from a bisazo or in particular a trisazo dye or a perylene dye.

The malonic acid dyes according to the present invention are prepared in the conventional manner. For example, malonic esters can be alkylated with a dihalogen compound of the formula VI Hal-A-Hal (VI)

where Hal is halogen, in particular bromine, and A is as defined above, in the presence of a base and the resulting alkylmalonic acid derivative can be reacted with a dye of the formula VII H—Y—Chr (VII)

where Chr is as defined above and Y is one of the above-mentioned radicals $Y^1$, $Y^2$ or $Y^3$, in the presence of a base to give the target product.

The novel malonic acid dyes are readily soluble in the common organic solvents, for example N,N-dimethylformamide, tetrahydrofuran, toluene or dichloromethane.

Furthermore, they are advantageous for preparing liquid crystalline dyes.

Compounds which exhibit liquid crystalline behavior, i.e. form liquid crystalline phases, are also termed mesogenics. They are optically anisotropic liquids which, unlike normal liquids, exhibit long range ordering of their molecules. As a solid mesogenic compound melts, therefore, it first forms a liquid crystalline phase, for example a smectic phase, which as the temperature increases further is transformed at a certain phase transition temperature either into a further phase, for example a nematic phase, or into an optically isotropic melt. If the latter is cooled back down again, the liquid crystalline phases and ultimately the crystalline state are reformed at the corresponding transition temperatures. However, in the case of polymers having mesogenic side groups, i.e. groups derived from mesogenic compounds, it is possible to freeze the liquid crystalline state by cooling the liquid crystalline polymer melt to below a certain temperature, for example the glass transition temperature of the polymer, thereby producing an optically anisotropic solid which is not crystalline but glassy.

Liquid crystalline phases are easy to detect in the melt or in the frozen state through their optical anisotropy. For instance, viewed under a polarizing microscope with crossed polarizers, they show birefringent textures, whereas isotropic melts appear dark.

It is therefore possible to use layers which contain mesogenic compounds for information recording by heating these layers in certain areas to create areas having altered optical properties. These areas, once they have cooled down and provided they are stable in that state, are detectable, i.e. readable.

Liquid crystalline phases can be divided into nematic, smectic and cholesteric phases. In a nematic phase, the centers of gravity of the molecules are arranged randomly, but the long axes lie generally in one direction. The cholesteric phase can be regarded as a special type of nematic structure, where the long axes of the molecules lie in one preferred direction within any individual layer. However, on transition from one plane to the next, the preferred direction of molecular alignment continuously changes in a direction of rotation, leading as a whole to a helical configuration for the cholesteric phase. In the smectic phase, the mesogenic compounds are oriented by intermolecular interactions into a parallel arrangement within planes which are stacked on top of one another with equal spacings in between.

The novel liquid crystalline dyes based on malonic acid dyes of the formula I are polycondensation products of the formula VIII

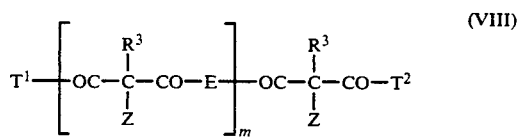 (VIII)

where
$R^3$ is hydrogen or $C_1$-$C_6$-alkyl,
Z is a radical of the formula A-Chr or a radical of the formula

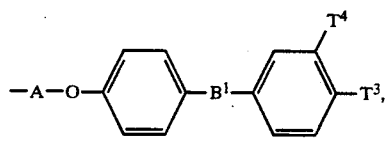

where
A is $C_1$-$C_{20}$-alkylene which may be interrupted by one or more oxygen atoms or by one or more imino or $C_1$-$C_4$-alkylimino groups,
Chr is the radical of a chromophore derived from an anthraquinone, perylene, disazo or trisazo dye or else, when $R^3$ is $C_1$-$C_6$-alkyl, from a monoazo dye,
$B^1$ is a chemical bond, ethylene, methyleneoxy or 1,4-phenylene, $T^3$ is $C_1$–$C_6$-alkoxy, nitro or cyano, and
$T^4$ is hydrogen, $C_1$–$C_4$alkyl or halogen,
E is a radical of the formula

—O—$B^2$—O— where $B^2$ is $C_2$–$C_{12}$-alkylene, 1,4-xylylene, 1,4-cyclohexylidene or a radical of the formula

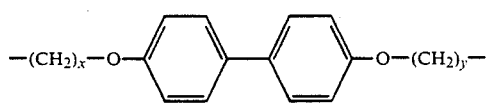

or

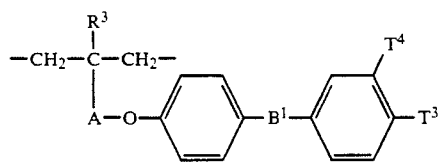

where $R^3$, A, $B^1$, $T^3$ and $T^4$ are each as defined above and x and y are identical or different and each is independently of the other from 2 to 12,
$T^1$ and $T^2$ are identical or different and each is independently of the other hydroxyl, $C_1$–$C_6$-alkoxy or E-H, where E is as defined above, and
m is from 1 to 200,
with the proviso that, based on 1 mol equivalent of substituent Z, from 0.001 to 1 mol equivalent of the radical of the formula A-Chr and from 0.999 to 0 mol equivalent of the radical of the formula

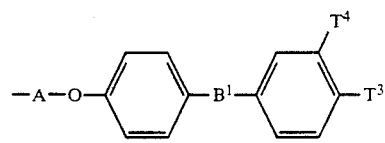

are present in the dye of the formula VIII.

Preference is given to liquid crystalline dyes of the formula VIII where $R^3$ is hydrogen, $T^1$ and $T^2$ are each $C_1$–$C_2$-alkoxy, E is

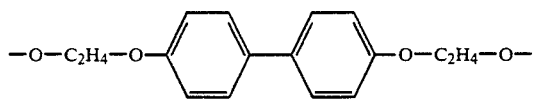

and Z is a radical of the formula A-Chr or a radical of the formula

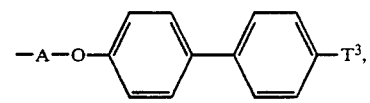

where A, Chr and $T^3$ are each as defined above, and m is from 10 to 100, preferably from 15 to 50, with the proviso that, based on 1 mol equivalent of substituent Z, from 0.01 to 0.7 mol equivalent, in particular from 0.05 to 0.3 mol equivalent, of the radical of the formula A-Chr and from 0.99 to 0.3 mol equivalent, in particular from 0.95 to 0.7 mol equivalent, of the radical of the formula

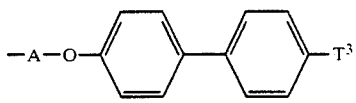

are present in the dye of the formula VIII.

The novel liquid crystalline dyes can be obtained in a conventional manner.

To prepare homopolycondensation products, it is possible for example to polycondense a malonic acid dye of the formula I with a dihydroxy component of the formula IX $$HO—B^2—OH \quad (IX)$$

where $B^2$ is as defined above. The polycondensation generally takes place in the melt at 100°–200° C. in the presence or absence of small amounts of a catalyst, e.g. nickel acetate, a tetraalkyl orthotitanate or sulfuric acid. The molar ratio of dye I:dihydroxy component IX is customarily about 1:1.

To prepare copolycondensation products, it is possible for example to condense a malonic acid dye of the formula I, a malonic acid derivative of the formula X

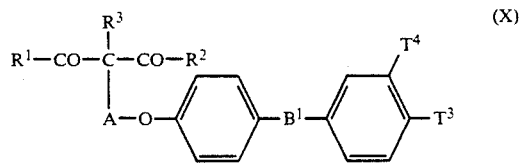

where $R^1$, $R^2$, $R^3$, A, $B^1$, $T^3$ and $T^4$ are each as defined above, and the dihydroxy component of the formula IX in the melt. The molar ratio of malonic acid dye I:malonic acid derivative X:dihydroxy component IX is in general from 0.1:99.9:100 to 99.9:0.1:100.

The novel liquid crystalline dyes of the formula VIII are advantageously suitable for laser optical writing and reading processes (see for example EP-A-278,446) or for use in an optical recording medium as described for example in U.S. Pat. No. 4,702,945. Recording layers containing the novel dyes VIII are notable for the high stability of the written spots.

Furthermore, they are highly suitable for use in displays. Displays which contain the dyes according to the present invention have large switching ranges and rapid switching times.

The Examples which follow illustrate the invention.

EXAMPLE 1

(a) General method for preparing diethyl ω-bromoalkylmalonates

An alcoholate solution prepared from 1 gram atom of sodium and 500 ml of ethanol is added dropwise at 100° C. to a mixture of 1 mol of diethyl malonate and 1.1 mol of the corresponding α,ω-dibromoalkane in the course of 2 hours. To complete the reaction, the mixture is subsequently stirred at the boil for 3 hours. After cooling, the sodium bromide formed is filtered off, and the ethanol is distilled off. After a single wash with 600 ml of water, the organic phase is dried over sodium sulfate.

Thereafter the excess diethyl malonate is distilled off under an aspirator vacuum. The subsequent fractionation under an oilpump vacuum using a 30 cm Vigreux column distills off the unreacted dibromoalkane and then the desired diethyl ω-bromoalkylmalonate. The residue left behind comprises the tetraethyl α,α,ω,ω-alkyltetracarboxylate by-product.

Diethyl 6-bromohexylmalonate: Yield: 47% of theory. Boiling point (0.020 mbar): 145°–149° C.

Diethyl 10-bromodecylmalonate: Yield: 36% of theory. Boiling point (0.005 mbar): 102°–104° C.

Diethyl 12-bromododecylmalonate: Yield: 41% of theory. Boiling point (2.0 mbar): 200°–205° C.

(b) Diethyl ω-bromoalkylmethylmalonates

They are prepared in the same way as a) starting from diethyl methylmalonate and the corresponding α,ω-dibromoalkanes.

Diethyl 6-bromohexylmethylmalonate: Yield: 50% of theory. Boiling point (2.0 mbar): 130°–136° C.

Diethyl 12-bromododecylmethylmalonate: Yield: 40% of theory. Boiling point (2.0 mbar): 185°–187° C.

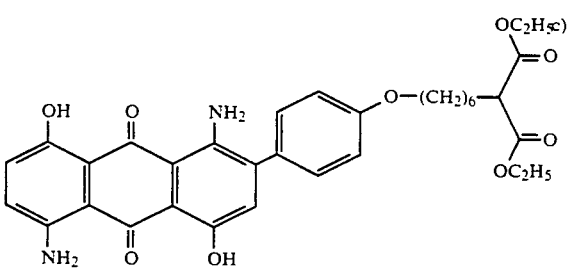

A mixture of 3.62 g (10.0 mmol) of 4,8-diamino-1,5-dihydroxy-3-(4-hydroxyphenyl)anthraquinone, 3.23 g (10.0 mmol) of diethyl 6-bromohexylmalonate, 5.6 g (40.0 mmol) of potassium carbonate, 0.5 g of potassium iodide and 50 ml of N,N-dimethylformamide was stirred at room temperature for 3 hours. The potassium carbonate was filtered off, the N,N-dimethylformamide was distilled off under an oilpump vacuum (80° C., 20.0 mbar), and the residue was recrystallized from 40:1 (v/v) toluene/ethyl acetate. This gave 2.91 g (48% of theory) of the target product. $\lambda_{max}$ (ε) (DMF): 595 nm (23627), 638 nm (29224). $C_{33}H_{36}N_2O_3$ (604).

Calculated: C 65.6, H 6.0, N 4.6, O 23.8.
Found: C 65.8, H 6.0, N 4.7, O 23.7.

$^1$H-NMR (CDCl$_3$): δ=1.2 (t; 6 H, OCH$_2$CH$_3$), 1.4 (m; 6 H, CH$_2$), 1.9 (m; 4 H, CH$_2$), 3.3 (t; 1 H, CH(CO$_2$C$_2$H$_5$)$_2$), 4.0 t; 2 H, CH$_2$), 4.2 (g; 4 H, OCH$_2$CH$_3$), 7.2 (m; 11 H, arom. CH, NH$_2$), 13.9 ppm (2 s; 2 H, OH). IR (KBr): 3500 to 3400 (NH$_2$), 3300 (OH), 3000 to 2800 (C—H), 1720 (COO), 1600 (C=C), 1572, 1544, 1461, 1294, 1281, 1248, 1205, 1170, 827 cm$^{-1}$.

The same result is obtained on reacting diethyl malonate with 6-[4-(4,8-diamino-1,5-dihydroxyanthraquinoyl)phenoxy]hexyl bromide as in a).

EXAMPLE 2

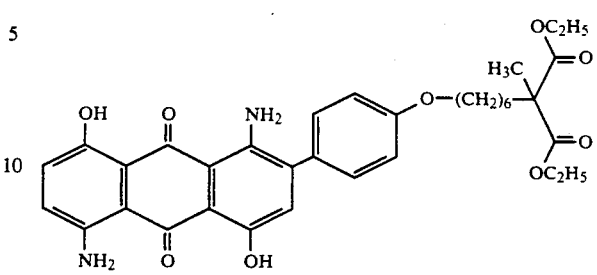

Prepared as described in Example 1, except that diethyl 6-bromohexylmethylmalonate was used.

$C_{34}H_{48}N_2O_9$ (618):
Calculated: C 65.0, H 7.6, N 4.5, O 23.0.
Found: C 64.5, H 6.6, N 4.2, O 23.6.

$^1$H-NMR (CDCl$_3$; 200 MHz): δ=1.1 (t), 1.4 (s, m), 1.9 (m), 4.0 (t), 4.1 (q), 6.8–7.4 (m), 14.0 (2 s).

IR (KBr): 3480, 3450, 3320, 3300, 3000–2800, 1725, 1600, 1572, 1543, 1461, 1281, 1250, 1227, 1207, 827 cm$^{-1}$.

UV (DNF): $\lambda_{max}$=594 nm (20,296), 639 nm (25,111).

EXAMPLE 3

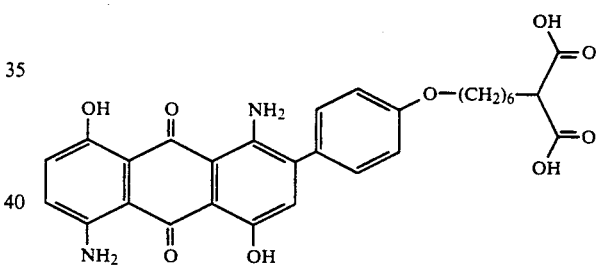

3.02 g (5.00 mmol) of the dye obtained as described in Example 1c) were introduced into a solution of 1.00 g (17.5 mmol) of potassium hydroxide, 1.50 ml of water and 30 ml of isopropanol. The reaction mixture was refluxed for 2 hours, and the solvent was then distilled off. The residue was dissolved in 50 ml of water. The solution was then brought to pH 1 with hydrochloric acid and filtered with suction. The residue was again suspended in 50 ml of water filtered off with suction and dried at 60° C. under reduced pressure This gave 2.7 g of the target product.

$C_{29}H_{28}N_2O_9$ (548): Calculated: C 63.5, H 5.1, N 5.1, O 26.3. Found: C 63.0, H 5.7, N 4.9, O 26.4.

$^1$H-NMR (D$_6$-DMSO): δ=1.3; 1.7 (m, 10 H, CH$_2$); 3.2 (t, $^1$H, CH(COOC$_2$H$_5$); 4.0 (t, 2 H, CH$_2$); 7.2 (m, 7H, aromat.); 7.8 (m, 4H, NH$_2$); 12.5 (bs, 2 H, COOH); 14.0 ppm (2 s, 2 H, Ar-OH));

IR (KBr): 3460, 3300, 2920, 2850, 1700, 1606, 1573, 1542, 1507, 1450, 1419, 1278, 1247, 1204, 1168, 827 cm$^{-1}$.

EXAMPLE 4

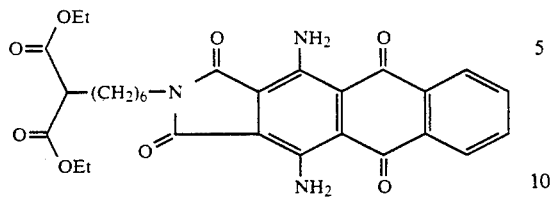

5.7 g (18.5 mmol) of 1,4-diamino-2,3-dicarboximideanthraquinone and 3.4 g (25.0 mmol) of finely powdered calcined potassium carbonate were introduced in 40 ml of absolute acetone. After a spatula tip of potassium iodide had been added, a solution of 4.2 g (18.5 mmol) of diethyl 6-bromohexylmalonate in 5 ml of absolute acetone was added dropwise into the boiling reaction mixture in the course of 1 hour. To complete the reaction, the reaction mixture was refluxed for a further 3 hours. It was then filtered with suction through a sintered glass frit, and the residue was washed with warm acetone. After the acetone had been distilled off, the crude product obtained was recrystallized three times from ethanol. This gave 7.3 g (67%) of the target product of melting point 123° C.

$C_{29}H_{31}N_3O_8$ (549): Calculated: C 63.4, H 5.7, N 7.7, O 23.3. Found: C 62.5, H 5.1, N 7.2, O 23.0.

IR (KBr): 3460, 3330, 3000–2800, 1738, 1723, 1695, 1605, 1581, 1565, 1440, 1325, 1291, 1263, 1171, 1030, 960, 950, 760, 730, 630, 608 cm$^{-1}$.

$^1$H-NMR (D$_6$-DMSO): δ=1.20 (t; 6 H), 1.30 (bs; 4 H), 1.60 (m; 2 H), 1.80 (m; 2 H), 2.50 (s; 4 H), 3.30 (s; 2 H), 3.40 (m; 1 H), 4.10 (m; 4 H), 6.4–7.2 (bs; 4 H), 7.80 (m; 2 H), 8.05 (m; 2 H), 8.40–9.00 (bs; 2 H).

UV (DMF): λ$_{max}$=673 nm (13923).

EXAMPLE 5

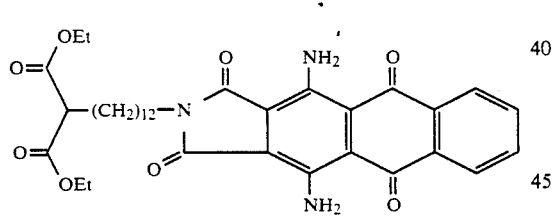

Prepared as described in Example 4.

$C_{35}H_{43}N_3O_8$ (633.8): Calculated: C 66.3, H 6.8, N 6.6, O 20.2. Found: C 66.0, H 6.2, N 5.8, O 19.5.

IR (KBr): 3460, 3420, 3320, 3300, 2980, 2920, 2850, 1746, 1733, 1691, 1562, 1445, 1322, 1300, 1171, 1155, 1060, 1040, 950, 760, 720, 660, 640 cm$^{-1}$.

$^1$H-NMR (D$_6$-DMSO) δ=1.10 (t; 6 H), 1.40 (m; 4 H), 1.60 (m; 2 H), 1.70 (m; 2 H), 3.30–3.60 (m; 3 H), 4.10 (q; 4 H), 6.40;14 7.20 (bs; 2 H), 7.90 (m; 2 H), 8.20 (m; 2 H), 8.40–9.00 (bs; 2 H).

UV (DMF): λ$_{max}$=673 nm (13,529).

EXAMPLE 6

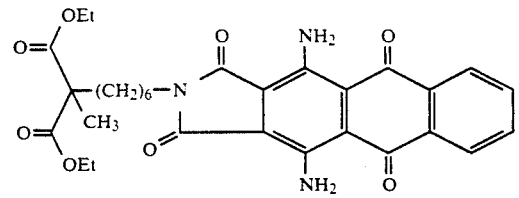

Prepared as described in Example 4.

$C_{30}H_{33}N_3O_8$ (563.6): Calculated: C 63.9, H 5.9, N 7.5, O 22.7. Found: C 64.0, H 6.2, N 7.3, O 22.8.

$^1$H-NMR (200 MHz; CDCl$_3$): δ=1.2 (t; 6 H), 1.4 (s), 1.7 (m), 1.9 (m) (13 H), 3.6 (t; 2 H), 4.2 (q; 4 H), 7.8 (m), 8.2 (m) (4 H), 10.0–14.0 ppm (m; 4 H).

IR (KBr): 3450, 3410, 3310, 3280, 3000–2800, 1747, 1725, 1688, 1603, 1563, 1295, 1276, 1254, 1155 cm$^{-1}$.

UV (DMF): λ$_{max}$=673 nm (15065).

EXAMPLE 7

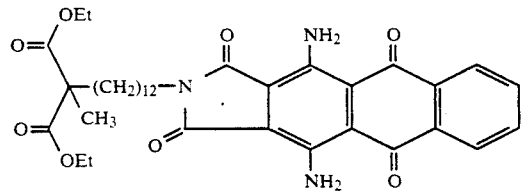

Prepared as described in Example 4.

$C_{36}H_{45}N_3O_8$ (647):

Calculated: C 66.8, H 7.0, N 6.5, O 19.8. Found: C 65.4, H 6.8, N 70, O 18.7.

$^1$H-NMR (200 MHz, CDCl$_3$): δ=1.2 (t; 6 H), 1.4 (s; 3 H), 1.7 (m), 1.9 (m) (24 H), 3.6 (t; 2 H), 4.2 (q; 4 H), 7.8 (m), 8.2 (m) (4 H), 10.0–14.0 ppm (1 m; 4 H).

IR (KBr): 3450, 3420, 3320, 3290, 3000–2800, 1729, 1691, 1600, 1561, 1545, 1297, 1258, 1172, 1159 cm$^{-1}$.

UV (DMF): λ$_{max}$=672 nm (13821 mol$^{-1}$l$^{-1}$).

EXAMPLE 8

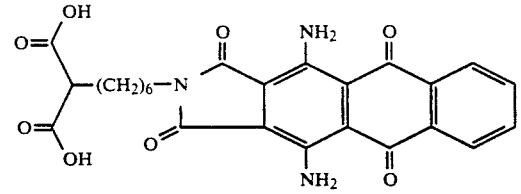

Prepared as described in Example 3.

$C_{25}H_{23}N_3O_8$ (493.5): Calculated: C 60.9, H 4.7, N 8.5, O 25.9. Found: C 59.0, H 4.8, N 7.2, O 25.6.

EXAMPLE 9

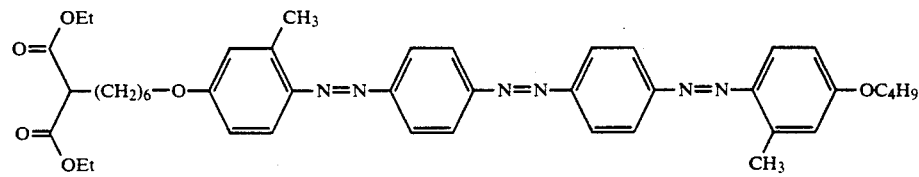

Prepared as described in Example 1.

$C_{44}H_{54}N_6O_6$ (763): Calculated: C 69.3, H 7.1, N 11.0, O 12.6. Found: C 68.5, H 7.1, N 11.1, O 12.5.

$^1$H-NMR (300 MHz; CDCl$_3$): δ=1.0 (t; 3 H), 1.3 (t; 3 H), 1.3–2.0 (m; 6 H), 2.8 (s; 6 H), 3.3–3.4 (t; 1 H), 4.0 (q; 4 H), 4.2 (q; 4 H), 6.8 (m; 4 H), 7.8 (d; 2 H), 8.0–8.2 ppm (m; 8 H).

IR (KBr): 3000–2800, 1750–1700, 1600, 1490, 1450, 1285, 1240, 1110, 870, 820 cm$^{-1}$.

DSC: g <20° C. s 140° C. n 165° C. i.

EXAMPLE 10

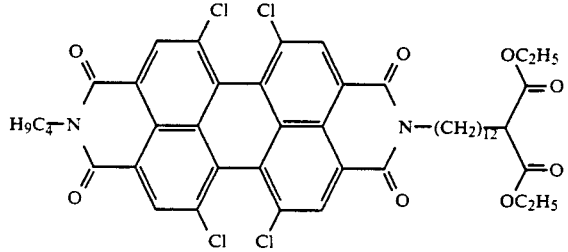

4.70 g (8.00 mmol) of N-butyl-1,6,7,12-tetrachloro-3,4,9,10-perylenebiscarboximide, 4.50 g (10.0 mmol) of diethyl 12-bromododecylmalonate and 2.20 g (16.0 mmol) of potassium carbonate and also a spatula tip of potassium iodide were added to 30 ml of N,N-dimethylformamide, and the mixture was stirred at 50° C. for 100 hours. The potassium carbonate was separated off, and the product was purified by column chromatography. This gave 4.00 g of the target product.

Melting point: 193–195° C.

λ$_{max}$ (CH$_2$CCl$_2$) 583 nm (23,000).

The same method gave the dyes listed below in Table 1.

TABLE 1

| Example No. | Dye | λ$_{max}$ [nm] (measured in CH$_2$Cl$_2$) |
|---|---|---|
| 11 |  | 595 (28735)<br>635 (28978) |
| 12 |  | 596 (23738)<br>638 (29029) |
| 13 |  | |
| 14 |  | |

TABLE 1-continued

| Example No. | Dye | $\lambda_{max}$ [nm] (measured in $CH_2Cl_2$) |
|---|---|---|
| 15 | 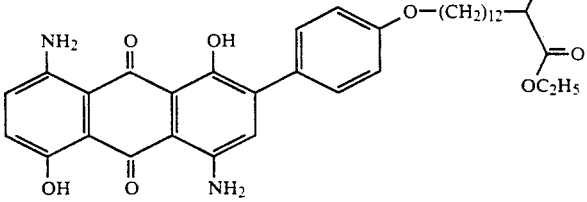 | 619 (24519) |
| 16 | 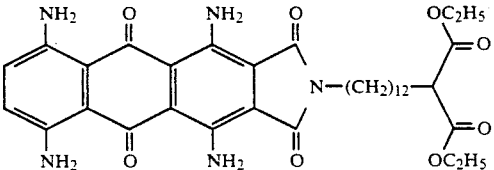 | 697 (18500)<br>750 (18700) |

EXAMPLE 17

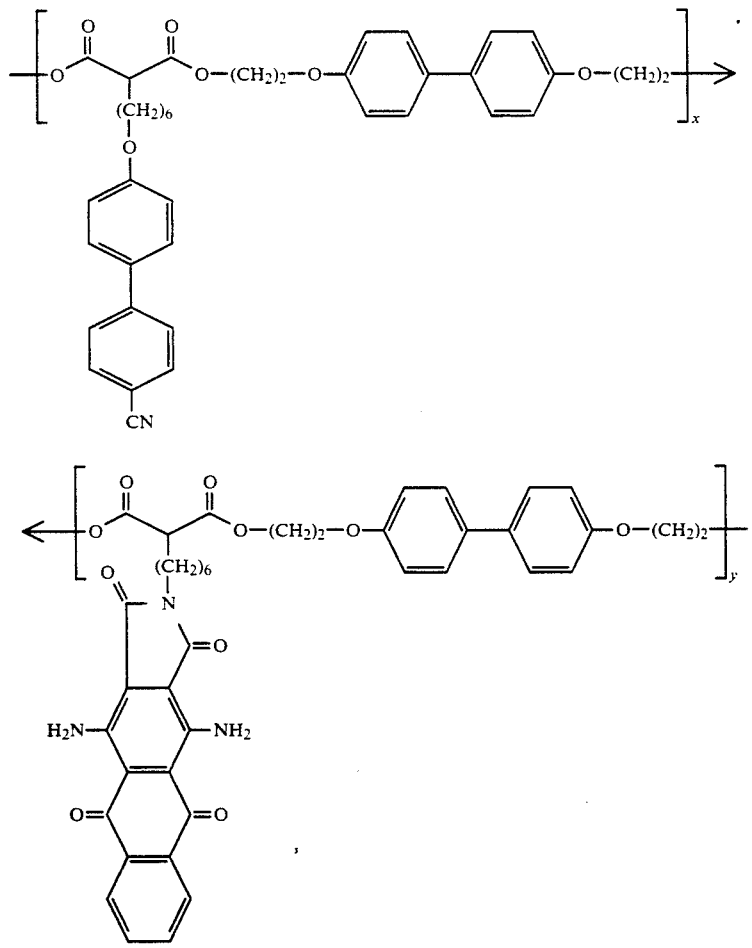

a) 4.15 g (9.5 mmol) of diethyl 6-[4-(4-cyanophenylphenoxy)hexyl]malonate, 270 mg (0.500 mmol) of the dye of Example 4 and 2.74 g (10.0 mmol) of 4,4'-bis(2-hydroxyethyloxy)biphenyl were heated together to 160° C. under a dry stream of argon. A melt formed, to which was added 0.020 g of tetraisopropyl orthotitanate in the form of a 20% strength by weight solution in ethylene glycol dimethyl ether, and the mixture was stirred under argon for 2 hours. After the addition of a further 0.020 g of tetraisopropyl orthotitanate, the pressure was reduced to 0.1 mbar in the course of 2 hours, and the mixture was left at 160° C. for a further 2 hours. After cooling and ventilating with argon, the polymer was dissolved in 5 ml of N,N-dimethylformamide in an ultrasonic bath and precipitated in 1000 ml of methanol.

Yield: 5.7 g of polymer. The analytical data are summarized in Table 2.

The indices x and y (and as the case may be z) mentioned in the above formula, in Table 2 and in what follows each denote mole percentages based on one mole of the particular dye.

TABLE 2

| Example No. 17 | x:y | Reaction conditions | GPC Mn | D | DSC |
|---|---|---|---|---|---|
| a | 95:5 | 2h/160° C./1013 mbar; 2h/160° C./0.1 mbar | 4928 | 1.7 | g70° C. s 125° C. n 168° C. i |
| b | 90:10 | 2h/160° C./1013 mbar; 2h/160° C./0.1 mbar | 4618 | 1.7 | g70° C. s 130° C. n 166° C. i |
| c | 90:10 | 2h/160° C./1013 mbar; 3,5h/160° C./0.1 mbar | 5058 | 1.8 | g65° C. s 127° C. n 171° C. i |
| d | 80:20 | 2h/160° C./1013 mbar; 2h/160° C./0.1 mbar | 4461 | 1.6 | g65° C. s 127° C. n 172° C. i |
| e | 80:20 | 2h/160° C./1013 mbar; 2h/160° C./0.1 mbar | 4643 | 1.6 | g65° C. s 127° C. n 172° C. i |
| f | 80:20 | 2h/160° C./1013 mbar; 3,5h/160° C./0.1 mbar | 4388 | 1.8 | g65° C. s 127° C. n 180° C. i |

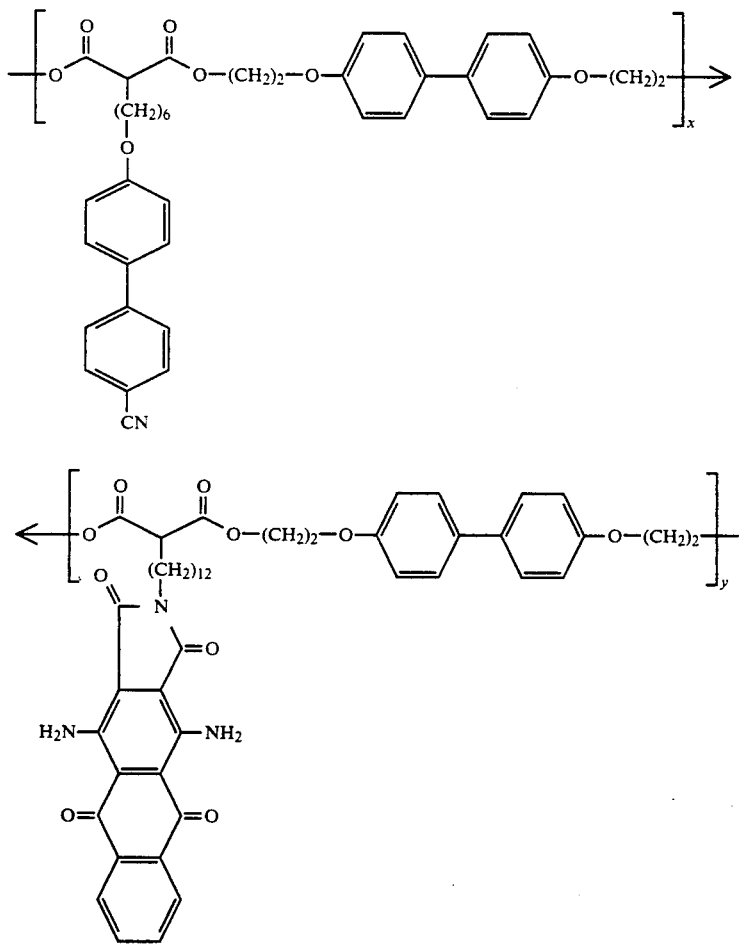

TABLE 3

| Example No. 18 | x:y | Reaction conditions | GPC Mn | D | DSC |
|---|---|---|---|---|---|
| a | 95:5 | 2h/160° C./1013 mbar; 2h/160° C./0 1 mbar | 4327 | 1.8 | g75° C. s 130° C. n 159° C. i |
| b | 90:10 | 2h/160° C./1013 mbar; 2h/160° C./0.1 mbar | 5174 | 1.7 | g75° C. s 126° C. n 156° C. i |
| c | 90:10 | 2h/160° C./1013 mbar; | 5461 | 1.7 | g75° C. s 136° C. n 171° C. i |

TABLE 3-continued

| Example No. 18 | x:y | Reaction conditions | GPC Mn | D | DSC |
|---|---|---|---|---|---|
| | | 2h/160° C./0.1 mbar | | | |
| d | 90:10 | 2h/160° C./1013 mbar; 6h/160° C./0.1 mbar | 5396 | 2.0 | g 65° C. $s_1$ 121° C. $s_2$ 145° C. n 174° C. i |
| e | 90:10 | 2h/160° C./1013 mbar; 14h/160° C./0.1 mbar | 6291 | 2.8 | g 65° C. $s_1$ 117° C. $s_2$ 149° C. n 176° C. i |
| f | 90:10 | 40h/160° C./1013 mbar; 50h/160° C./0.1 mbar | 5301 | 5.7 | g 65° C. s 114° C. n 169° C. i |
| g | 90:10 | 2h/160° C./1013 mbar; 65h/160° C./0.1 mbar | 5545 | 2.6 | g 65° C. s 114° C. n 169° C. i |
| h | 90:10 | 2h/160° C./1013 mbar; 3,5h/170° C./0.1 mbar | 6485 | 2.5 | g 65° C. s 114° C. n 169° C. i |
| i | 90:10 | 2h/160° C./1013 mbar; 3,5h/180° C./0.1 mbar | 6130 | 2.0 | g 65° C. s 114° C. n 169° C. i |
| j | 90:10 | 2h/160° C./1013 mbar; 3,5h/190° C./0.1 mbar | 5375 | 2.3 | g 65° C. s 114° C. n 169° C. i |
| k | 90:10 | 2h/160° C./1013 mbar; 3,5h/200° C./0.1 mbar | 5868 | 2.2 | g 65° C. s 114° C. n 169° C. i |

EXAMPLE 19

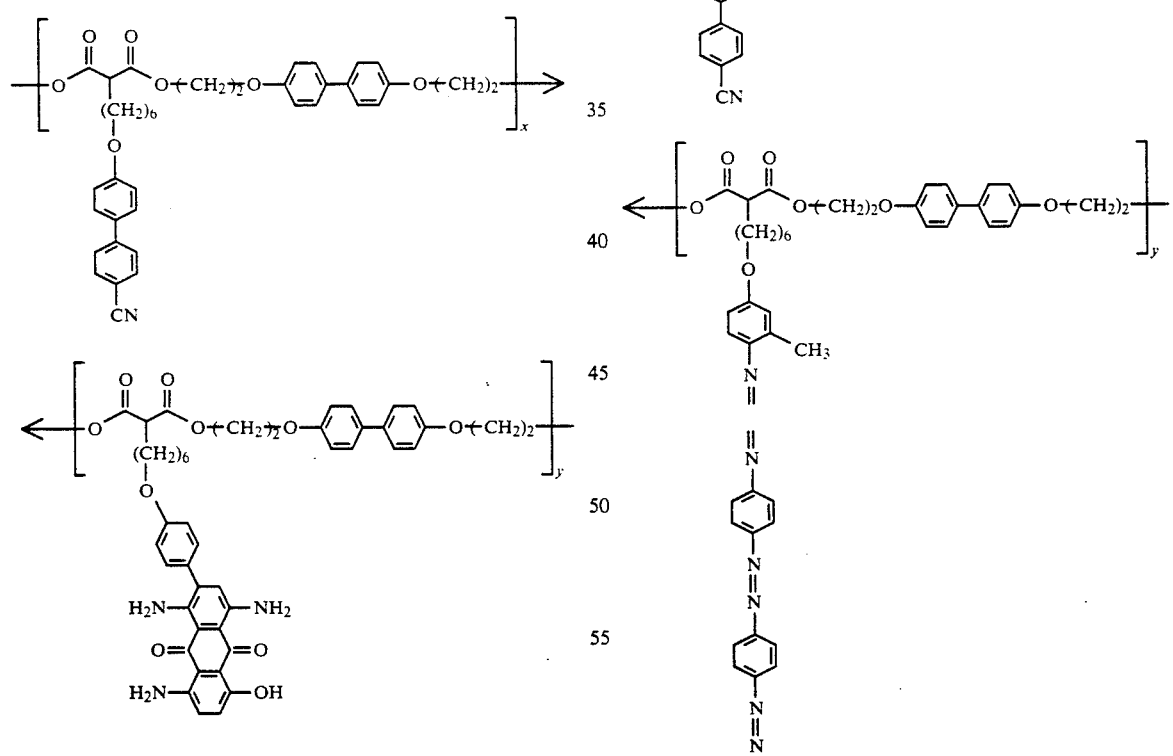

TABLE 4

| Example No. 19 | x:y | Reaction conditions | GPC Mn | D | DSC |
|---|---|---|---|---|---|
| a | 90:10 | | 1850 | 1,3 | g 65° C. s 126° C. n 155° C. i |
| b | 95:5 | | | | g 75° C. $s_1$ 100° C. $s_2$ 125° C. n 150° C. i |

EXAMPLE 20

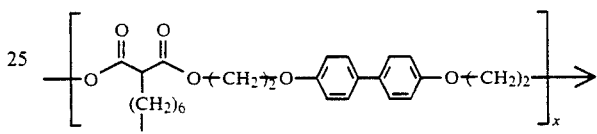

(x:y = 95:5)

Yield: 3.2 g
Mn = 6893, D = 2.3
DSC: g 50° C. $s_1$ 105° C. $s_2$ 140° C. n 207° C. i IR (KBr): 3600–3400 (NH), 3200–3000 (=CH), 3000–2800 (—C—H) 2220 (—C=N), 1751, 1732 (C=O), 1603 (C=C), 1498, 1289, 1269, 1242, 1176, 1152, 821 cm$^{-1}$.

$^1$H-NMR (CDCl$_3$, 300 MHz): δ=1.00–2.10; 2.80; 3.50; 3.90; 4.10; 4.50; 6.90; 7.00–7.80; 8.00–8.2 ppm.

EXAMPLE 21

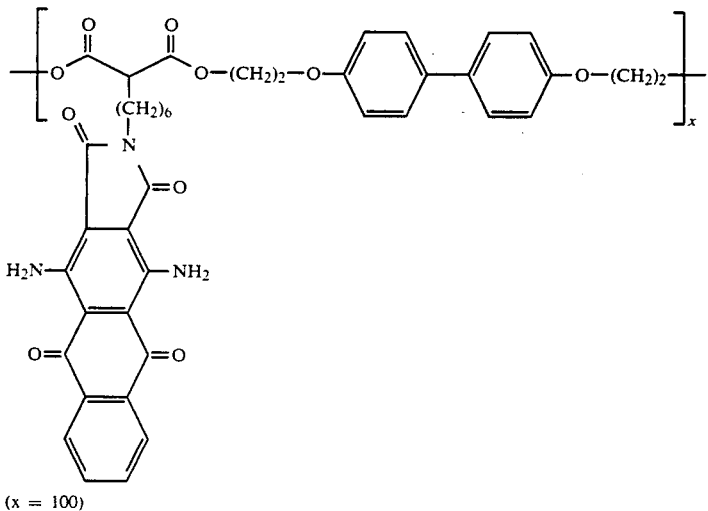

(x = 100)

2.75 g (5.00 mmol) of the anthraquinone dye of Example 4 and 1.47 g (5.00 mmol) of 4,4'-bis(2-hydroxyethoxy)biphenyl were melted together at 190° C. under argon. The melt was cooled down to 160° C., and 1 drop of a solution of tetraisopropyl titanate in diglycol dimethyl ether (1:9) was added. The mixture was stirred at 160° C. for 1 hour, at 165–170° C. for half an hour and at 175–180° C. for a further half hour. Thereafter a further drop of the titanate solution was added, and the pressure was reduced to 0.1 mbar in the course of half an hour. The reaction mixture was left at 200° C. for 2 hours, and the ethanol formed was distilled off. The mixture was then cooled down and ventilated with argon. The reaction mixture was insoluble in tetrahydrofuran and dichloromethane. It was slightly soluble in N,N-dimethylformamide at 120° C.; this solution was precipitated in methanol. 160 g of product were obtained.

EXAMPLE 22

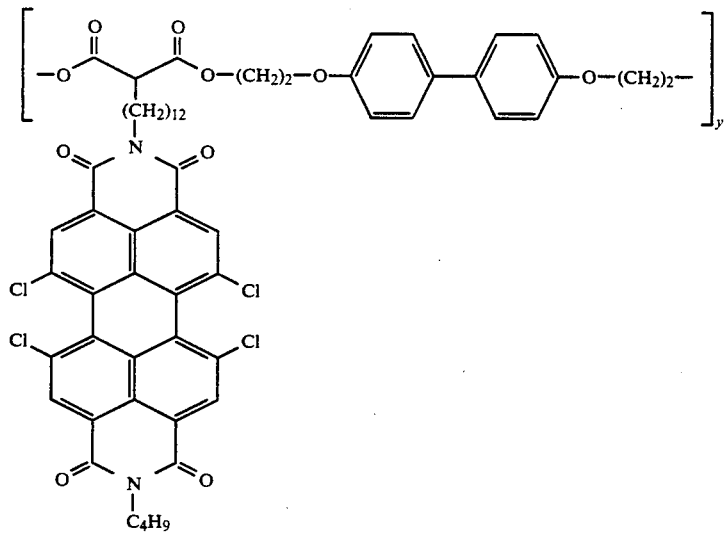

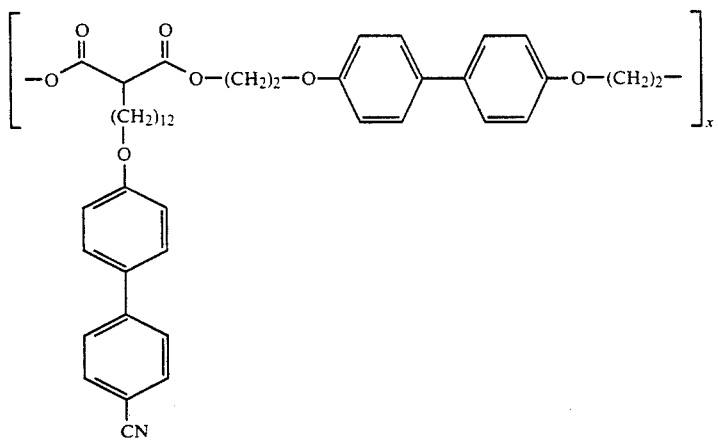

(x:y = 95:5)

EXAMPLE 25

1.97 g (4.50 mmol) of diethyl 6-[4-(4-cyanophenyl)-phenoxy]hexylmalonate, 0.45 g (0.50 mmol) of the dye of Example 11 and 1.37 g (5.00 mmol) of 4,4'-bis(2-hydroxyethoxy)biphenyl were melted together at 180°–190° C. A drop of a solution of tetraisopropyl titanate in diglycol dimethyl ether (1:9) was added, and the mixture was stirred at 180°–190° C. for a further 2 hours. After a further addition of one drop of the catalyst mixture, the pressure was reduced to 0.1 mbar in the course of 2 hours, and the ethanol formed was distilled off. After stirring at 190° C./0.1 mbar for 20 hours, the mixture was cooled down and ventilated with argon, and the residue was taken up in 50 ml of tetrahydrofuran. The solution was filtered, and the polymer was then precipitated in 500 ml of methanol. The polymer was filtered off and taken up in 100 ml of tetrahydrofuran, the solution was filtered, and the filtrate was precipitated in 1 l of diethyl ether. The precipitate was filtered off and dried at 50° C. under a high vacuum. This gave 2.60 g of polymer having a dye content of 5.5% (chlorine analysis).

$Mn = 4411$; $D = 12.3$

DSC: g 65° C. $s_1$ 90° C. $s_2$ 115° C. $s_3$ 135° C n 158° C. i

UV ($CH_2CCl_2$) $\lambda_{max} = 519, 485, 426, 380$ nm

IR (KBr): 3100–3000, 3000–2800, 2220, 1751, 1733, 1700, 1604, 1499, 1290, 1269, 1244, 1176, 1154, 822 cm$^{-1}$.

H-NMR (CDCl$_3$): δ = 1.35, 1.70, 2.00, 3.50, 3.95, 4.15, 4.50, 6.70–7.80 ppm

The compounds listed in the Examples which follow were obtained in a similar manner.

EXAMPLE 23

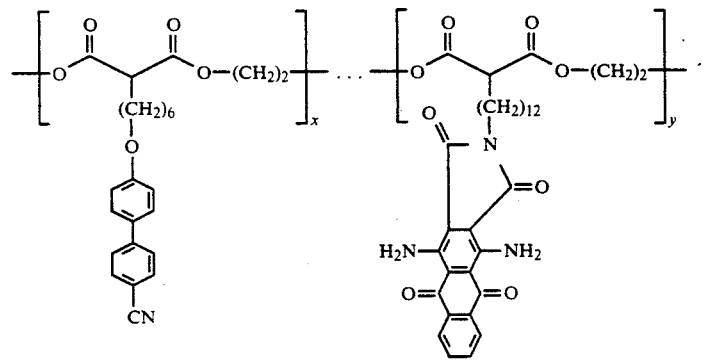

(x:y) 95:5

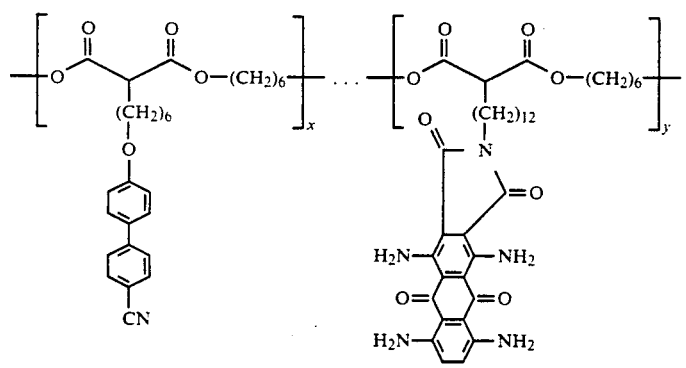
(x:y = 90:10)
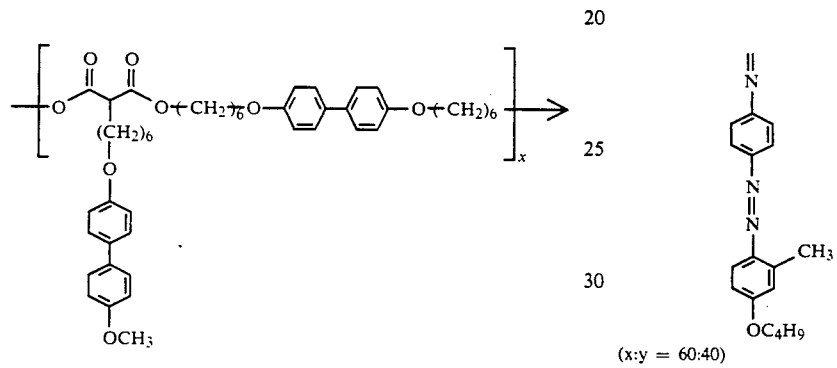
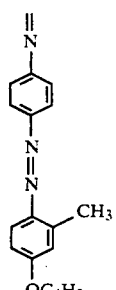
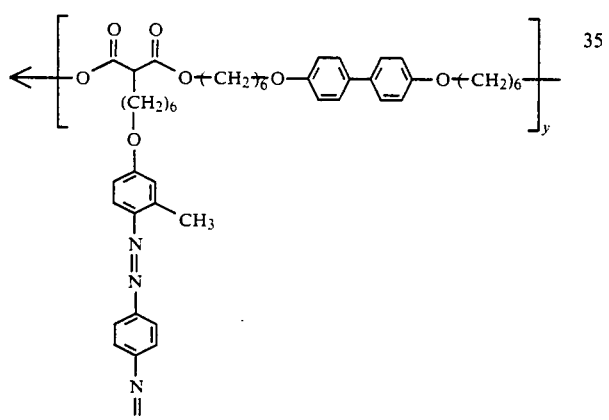
-continued
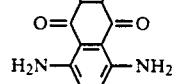
(x:y = 60:40)
EXAMPLE 26
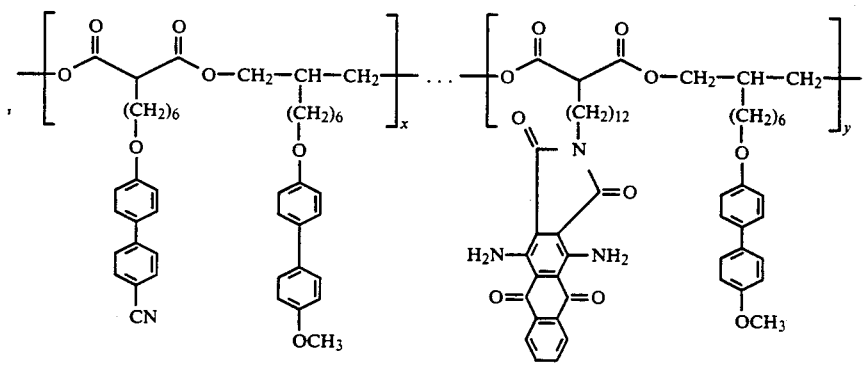
(x:y = 80:20)

EXAMPLE 27
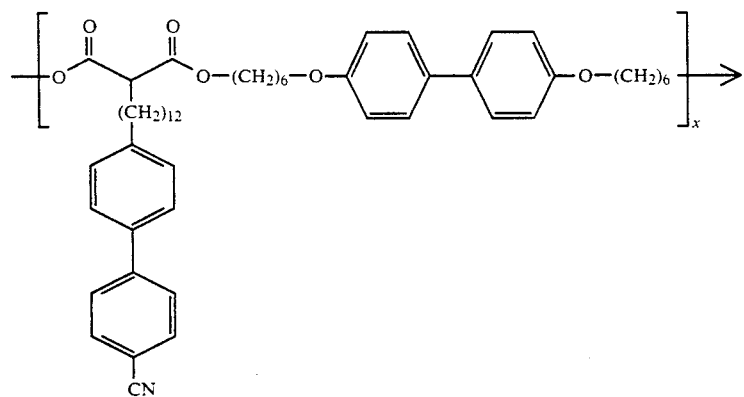
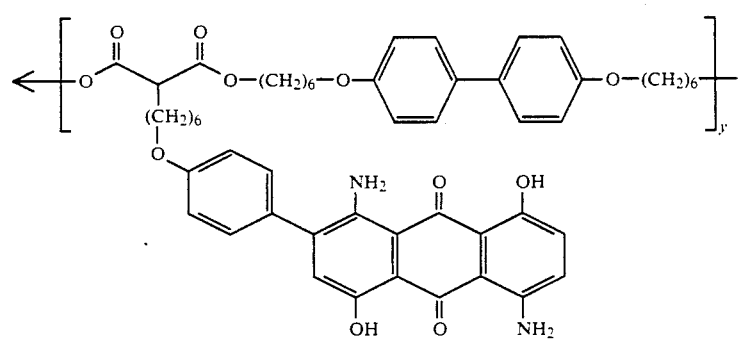
(x:y = 90:10)
EXAMPLE 28
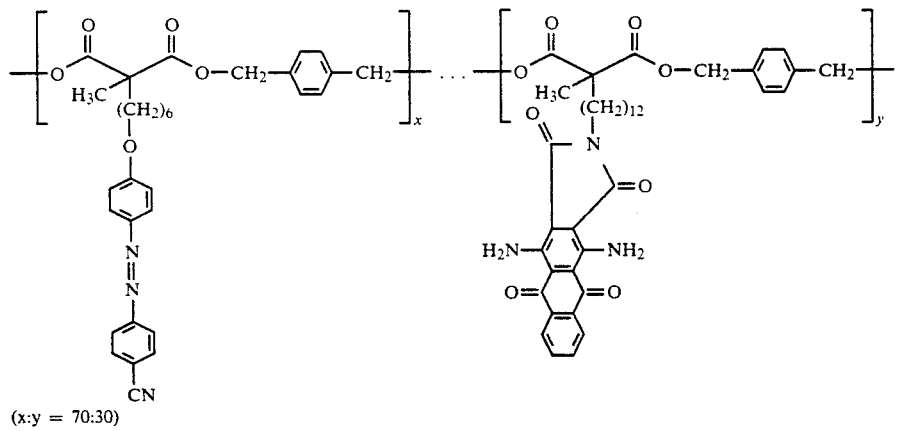
(x:y = 70:30)
EXAMPLE 29
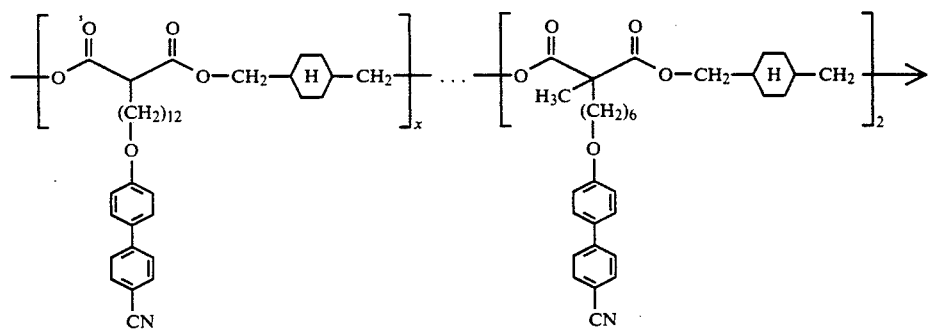

-continued
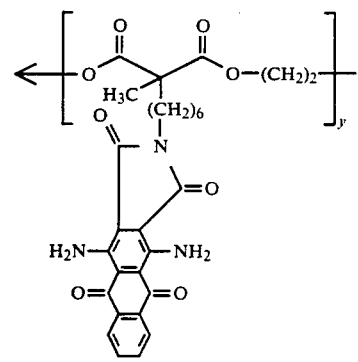
(x:y:z = 40:10:50)
EXAMPLE 30
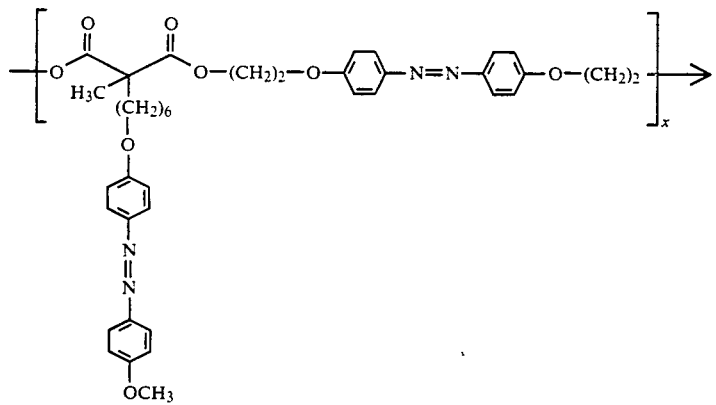
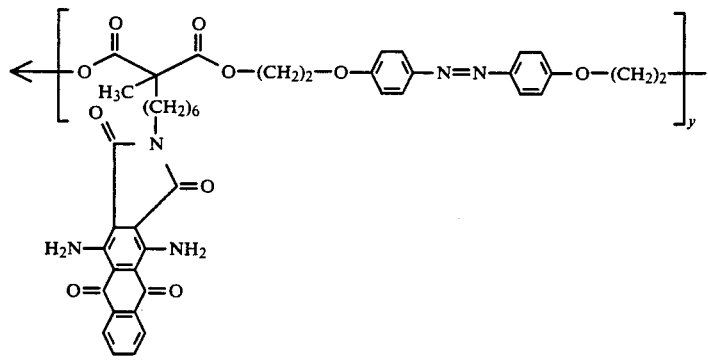
(x:y = 60:40)

EXAMPLE 31

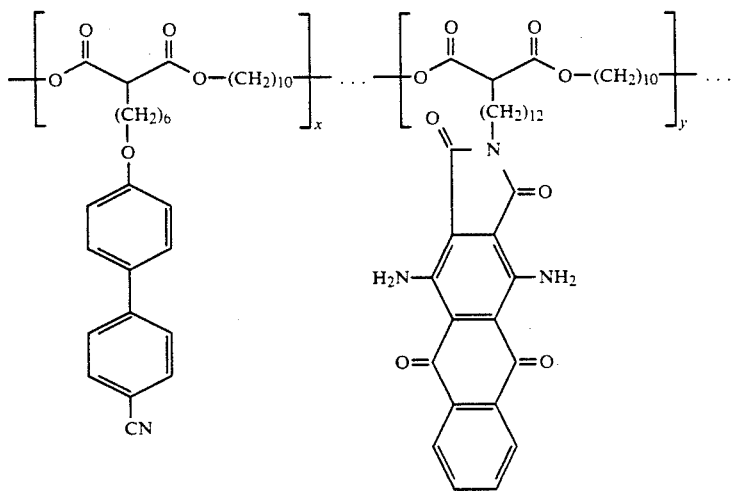

(x:y = 80:20)

Application in optical data memories

General method of fabrication

A cleaned, dustless glass disk 13 cm in diameter was coated with a 50-100 nm thick orienting layer of polyimide by spincoating with a 3% strength solution of a polyimide precursor (e.g. ®ZLI 2650 from Merck) and subsequent drying and curing of the wet film at 300° C. Thereafter the polyimide layer was provided with fine, tangential orienting grooves by turning the glass disk while rubbing it with a piece of velour or with a carbon fiber brush.

On top of this orienting layer the recording layer was produced by spincoating with a 15% strength solution of a liquid crystalline dye in tetrachloroethane, drying the wet film and baking the dry layer at 100° C. The bake serves to orient the mesogenic dichroic side groups of the liquid crystalline dye in a homogeneously planar and tangential orientation. The thickness d of the recording layer was set via the speed of rotation of the glass disk during spincoating and via the concentration of the dye solution. Thereafter the recording layer was coated with a 100 nm thick reflector layer of gold applied by vacuum deposition.

The resulting laser optical data disks make it possible to write and read data.

The writing and reading were effected with a writing and reading head comprising
an He-Ne gas laser emitting light of wavelength 633 nm which was intensity modulated by means of an acoustooptical modulator for writing the data. The power of the laser during writing was 10 mW and during reading in the continuous line mode 0.5 mW, and
a polarizing beam splitter.

The polarizing beam splitter was arranged in such a way that the plane of polarization of the incident light on the storage layer formed an angle of 45° C. with the director axis of the liquid crystalline dye.

Table 5 below shows the data measured for each of the dyes of Examples No. 17b, 18f and 19b.

TABLE 5

| Dye | Layer thickness [μm] | Birefringence (790 nm) | Order parameter | Threshold energy density [nJ/μm$^2$] |
|---|---|---|---|---|
| 17b | 0.7 | 0.28 | 0.65 | 1.03 |
| 18f | 0.45 | 0.17 | 0.53 | 0.72 |
| 19b | 0.30 | 0.20 | 0.36 | 0.50 |

Application in displays a) Table 6 below shows the order parameter S measured at room temperature in commercial displays having homogeneously planar edge orientation (polyimide ZLI 1840 from E. Merck, Darmstadt), the absorption maxiumum $\lambda_{max}$ and the solubility measured at room temperature in ZLI 1840 of dyes of Examples 1, 3, 4, 5, 10 and 11.

TABLE 6

| Dye No. | 1) | 2) | 3) |
|---|---|---|---|
| 1 | 0.70 | 1.1% | 640 nm (26000) |
| 3 | 0.65 | 0.03% | 639 nm (27000) |
| 4 | 0.68 | 0.15% | 680 nm (15000) |
| 5 | 0.68 | 0.8% | 681 nm (15700) |
| 10 | 0.76 | 1.3% | 419 nm (60500) |
| 11 | 0.76 | 1.5% | 525 nm (23000) |

1) Order parameter S (at RT) in ZLI 1840
2) Solubility in ZLI 1840
3) $\lambda_{max}$ ZLI 1840 b) The table below shows the switching range and the switching time at $(T_k - 1)°$ C. for the dyes of Examples 17a, 18a and 18b measured in commercial display cells having a homogeneously planar edge orientation (from EHZ, Tokyo) and a cell thickness of 2 μm.

TABLE

| Dye No. | Switching range | Switching time [msec] (10-90% utilization) |
|---|---|---|
| 17a | 149.5° C.-163° C. | 7.8 |
| 18a | 130° C.-158° C. | 6.0 |
| 18b | 126° C.-156° C. | 9.6 |

We claim:
1. A malonic acid dye of the formula I

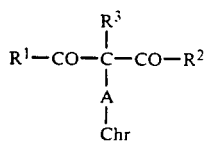 (I)

where
- $R^1$ and $R^2$ are identical or different and each is independently of the other hydroxyl, $C_1$-$C_6$-alkoxy, chlorine or bromine,
- $R^3$ is hydrogen or $C_1$-$C_6$-alkyl,
- A is $C_1$-$C_{20}$-alkylene which may be interrupted by one or more oxygen atoms or by one or more imino or $C_1$-$C_4$-alkylimino groups, and
- Chr is the radical of a chromophore derived from an anthraquinone, perylene, disazo or trisazo dye wherein when Chr is derived from an anthraquinone or trisazo dye its bonding to A is through a chemical bond, oxygen, sulfur, imino, $C_1$-$C_4$-alkylimino, phenylene, phenyleneoxy, phenylenethio or a radical of the formula —CO—, —CO—O—, —O—CO—, —CO—S—, —S—CO—, —CO—NH—, —NH—CO—, —CO—M— or —M—CO—, where M is $C_1$-$C_4$-alkylimino, when Chr is derived from a perylene dye its bonding to A is through a chemical bond, oxygen, phenylene or phenyleneoxy, and when Chr is derived from a disazo dye its bonding to A is through a chemical bond, oxygen, sulfur, imino, $C_1$-$C_4$-alkylimino, phenylene, phenyleneoxy, SO or $SO_2$.

2. A malonic acid dye as claimed in claim 1, wherein Chr is the radical of a chromophore derived from an anthraquinone, perylene or trisazo dye.

3. The dye of claim 1, which is of the formula

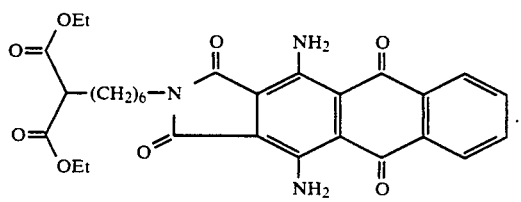

* * * * *